Nov. 25, 1952 — C. S. ADAMS — 2,618,866

EDUCATIONAL DEVICE

Filed Aug. 31, 1951

FIG. 1

MULTIPLE CHOICE QUESTION AND ANSWER SHEET

SCRIBE SPACE OPPOSITE CHOSEN ANSWER WITH STYLUS

CONTINUE CHOOSING UNTIL COLOR REPRESENTING RIGHT ANSWER APPEARS

BLUE = RIGHT          RED = WRONG

1. WHICH IS THE SQUARE ROOT OF 625
   - (a) 15       25
   - (b) 25       28
   - (c) 35       26
   - (d) 45       27

2. WHAT NEXT FOLLOWS IN SEQUENCE AFTER 1, 3, 7, 15, 31 ---
   - (a) 43       29
   - (b) 71       30
   - (c) 69       31
   - (d) 63       32

FIG. 2

YES OR NO QUESTION SHEET

SCRIBE IN THE YES OR NO COLUMN WITH STYLUS ACCORDING TO YOUR CONCLUSIONS

BLUE = CORRECT          RED = WRONG

|   | YES | NO |
|---|---|---|
| 1. RED LIGHT HAS A SHORTER WAVE LENGTH THEN BLUE LIGHT | 37 | 33 |
| 2. A METER IS 37½ INCHES IN LENGTH | 38 | 34 |
| 3. A POLE IS 16½ FEET IN LENGTH | 35 | 39 |
| 4. A LONG TON IS 2400 POUNDS | 40 | 36 |

INVENTOR
CLYDE S. ADAMS
BY Carl Beust
Justin S. Compton
HIS ATTORNEYS

Patented Nov. 25, 1952

2,618,866

UNITED STATES PATENT OFFICE 2,618,866

EDUCATIONAL DEVICE

Clyde S. Adams, Yellow Springs, Ohio, assignor to The National Cash Register Company, Dayton, Ohio, a corporation of Maryland Application August 31, 1951, Serial No. 244,550

13 Claims. (Cl. 35—9)

This invention relates to an educational device in the form of sensitized record material for use in recording examination answers, and more particularly pertains to such record material in which the person being examined only uses a stylus to scribe the record material according to his choice of answer, from among the multiple choice areas provided thereon representing the proposed answers.

The answer areas, normally visually indistinguishable in color, are sensitized to give a distinctive color if rubbed or scribed with a stylus, said color being of one hue if the chosen area represents the correct answer and of another hue if the chosen area represents a wrong answer. Before the scribing is made not only are these areas indistinguishable in color from one another but are indistinguishable from the remainder of the record material sheet and, thus, give no indication to the examinee which area should be scribed to indicate the correct answer. It will be seen, therefore, that if the color code is furnished the examinee, he will know after he has scribed the chosen area whether such was a correct choice or not, depending on the color which appears. The record material is so made that the colored marks once made cannot be obliterated without destruction of the normal appearance of the particular area or of the record material sheet as a whole, nor can the examinee sample an answer area without being detected.

The record material provided by this invention is unique in that the number of choices made by the examinee before the correct answer is chosen may be determined from the number of areas scribed before the color representing the correct answer appeared.

The record material sheet may be overprinted with instructions and the questions, leaving areas marked out for answer choices, without in any way interfering with the sensitivity of such answer areas. It is within the scope of the invention to provide colors for right and wrong, which are a compound of spectral hues so that even a color-blind individual will be able to see the results of his use of such record material.

Such record material requires nothing but a stylus, such as a glass rod, for scribing it, and the examinee himself may know his own score before submitting the paper to the examiner.

The record material, if desired, may be scored by a machine which photo-electrically distinguishes between the color of the correct answers and the color of the incorrect answers by use of proper color filters.

The sensitization is accomplished by applying all over the base record sheet material a coating of particles of inorganic clay-like acid material, which is masked by an insulating binder which is pressure-rupturable by a stylus to expose the clay-like particles. This clay-like coating, of course, may be applied only to those areas which will receive the examinee's answers, if it is desired not to sensitize the entire sheet. Such clay-like materials are equivalent in appearance to commercial paper coating clays and the binder material may be similar to those used in binding such paper-coating clays to paper, but used in amounts which will insure that the clay-like particles normally are masked. Over the clay coating, covering the areas where answers are to be scribed there is applied a color-reactant organic compound dissolved in a volatile solvent so that upon evaporation thereof the compound will be in solid form on top of the binder of the coating over said areas. These color-reactant compounds preferably are colorless and are chosen from aromatic double bond organic compounds which change to a more highly polarized conjugated form upon coming into adsorption contact with the clay-like materials with which the record sheet has been coated, forming a distinctive color hue. When the examinee scribes with his stylus across one of these areas the overlying organic color-reactant compound particles are driven through and rupture the binder for the clay-like material and are ground into the clay-like material and adsorbed thereon, producing the distinctive color. The color reactions require no moisture or hygroscopic materials, the reaction being entirely on a dry basis.

Paper sensitized all over with a single organic color reactant so as to make a distinctively colored mark wherever a stylus is scribed thereover is disclosed and claimed in United States Patent 2,505,470, which issued on the application of Barrett K. Green, and in the divisions thereof. The process for making such record material which is sensitized to produce one color all over is disclosed and claimed in United States Patent 2,505,471, which also issued on the application of Barrett K. Green. The record material of this invention is distinguished from that of the patents to which reference has been made in that in the record material of this invention the sensitization of the sheet is made so as to produce different colors, according to which area of the record material sheet is scribed, the sheet itself giving no indication visually to the examinee as to where the areas responding in the various colors are located, that is to say: there is no visible indication on the sheet as to what color will appear at the sensitized points.

Colorless organic color-reactant compounds are available to produce any one of a number of spectral hues and, hence, the novel record material may be sensitized so that more than two colors can be provided.

Although the drawing shows embodiments of the record material in which the questions to which the examinee is to respond are printed or written upon the sensitized sheet, the invention may be embodied in a sheet which only contains the sensitized areas representing the possible answers, without the questions being printed or written thereon, in which case the questions will be printed on a second sheet or otherwise supplied to the examinee.

With these and incidental objects in view, the invention includes certain novel features, a preferred form or embodiment of which is hereinafter described with reference to the drawing which accompanies and forms a part of this specification.

In the drawing:

Fig. 1 represents a record sheet on which the questions are printed and on which a number of proposed answers and corresponding sensitized areas are provided for each question.

Fig. 2 is a similar sheet except that the answer areas are provided in "Yes" and "No" columns. A limited number of questions are shown in each of these examples, the points of invention being amply illustrated thereby.

In the preferred form of the invention a sheet of paper 20 (Fig. 1) is provided with a coating 22, on the surface thereof, said coating including the acid clay-like material, particles of kaolin in this instance, protected by and held thereon in a casein binder material. This coating which extends over the entire surface of the paper sheet is white, just as is ordinary kaolin-coated paper.

The kaolin coating may be made according to the process described in United States Patent 2,505,471, to which reference was made, and this method will be described herein in detail. A slurry of kaolin and water is prepared, including 50 parts, by weight, of kaolin to 50 parts, by weight, of water, the dispersion being facilitated by 0.075%, by weight, of sodium metaphosphate. Next a 20%, by weight, solution of casein in water is formed by first dispersing the casein in cold water, stirring it for fifteen minutes at room temperature and then heating the dispersion up to 60 degrees centigrade. Five parts, by weight, of a 28% ammonium hydroxide solution—that is, one having a specific gravity of 25.9° Bé., at 4/20° C. is then added to the hot casein solution which is stirred for about fifteen minutes and allowed to cool at room temperature. The kaolin slurry and the alkaline casein solution are then thoroughly mixed and blended in the ratio ten parts, by weight, of kaolin slurry to one or two parts of casein solution, and at this stage a small percentage—for instance about 0.05%, by weight—of a solution of equal parts, by weight, of tributyl phosphate in alcohol, or other anti-foaming agent, is added. This mixture of the kaolin slurry and the casein solution is then applied to the paper as a coating, dried, and calendered, or treated in any desired way to give the proper surface finish. The coating when dried may be as light in weight as .0023 pound per square foot of surface with a thickness of the order of from .0005 to .001 of an inch. The thickness of the coating varies, with the treatment to which the record material is subjected in the surface finishing process. The solid particles of kaolin should be of the order of ten microns in diameter, although considerable variation in particle size is possible without causing any ill effects.

Gelatin, methyl cellulose, starch, polyvinyl alcohol, and animal glue are representative organic hydrophilic colloid materials that may be substituted for casein as a solid insulating medium. As substitutes for kaolin may be mentioned, attapulgite, pyrophyllite, talc, bentonite, halloysite, calcium sulphate and others to be found in the United States Patent No. 2,505,471.

Referring again to Fig. 1, the prepared record material is differentially treated in the answer areas, which are the series of square areas 23 and 24. The squares 25, 26 and 27 representing wrong answers will be treated with an organic compound which will turn to a red color when scribed with a stylus, whereas the square 28, representing the correct answer, will be treated with an organic compound which will turn blue when scribed with a stylus. In both instances the areas normally are indistinguishable from the rest of the sheet. In the preferred form of the invention, not only are the treated areas indistinguishable from one another before being turned to the colored form by scribing, but they do not apparently differ from the rest of the sheet in color or surface characteristics. In order to obtain the blue color the area 28 is treated with a solution of crystal violet lactone dissolved in toluene. A solution of 3%, by weight, of the crystal violet lactone in toluene is sufficiently strong and the area may be sensitized by applying a solution thereto by a swab or other applicator, or by dropping a drop of the solution on said area in such quantity so that it will not run into the other areas. After drying, upon scribing this area with a stylus, a dark blue color appears. Areas 25, 26 and 27 are treated with a toluene solution containing 3%, by weight, of xanthene-9,o-benzoic acid, 3,6-bis-diethylamino-9-p-nitroanilino-, lactum in the same manner as the crystal violet lactone was applied. On scribing these areas a red color will appear.

The crystal violet lacetone is 3,3 bis(p-dimethylaminophenyl)-6-dimethylamino phthalide and may be made by the method described in United States Patent Re. 23,024, which issued on the application of Clyde S. Adams. The xanthene-9,o-benzoic acid, 3,6-bis-diethylamino-9-p-nitroanilino-, lactam, has the structure

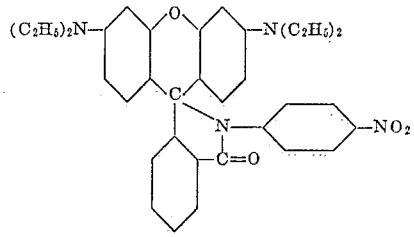

and is also known as N-p-nitrophenyl rhodamine-B lactam. In a similar manner the squares 29, 30 and 31 will be sensitized to show red upon being scribed, and the square 32 will be sensitized to show blue when scribed.

It will be appreciated that the examiner in scoring these answers will be informed as to the number of choices it took the examinee to reach the correct answer.

It will be understood that there is no significance given to the colors except that which the examiner gives them, and the significance may be noted at the top of the sheet as shown in Figs. 1 and 2, or otherwise made known to the examinee.

In Fig. 2 the squares 33, 34, 35 and 36 are sensitized with crystal violet lactone to show blue when scribed, whereas the squares 37, 38, 39 and 40 are sensitized with the lactam compound, mentioned, to show red when scribed.

The printed instructions, questions, answer choices and answer squares may be printed on the sheet by ordinary letter-press printing operations, or equivalent, without in any way affecting the sensitivity of the material in other spots or areas. The answer areas in the sheets of Figs. 1 and 2 have been defined by hollow printed squares, but such areas may be defined by other enclosed geometrical configurations, by underlining the areas, by putting a dot in the middle of the areas, or in any other manner.

The color hue which is obtained by scribing the treated answer areas is determined by the applied organic compound and not by the clay-like material forming the background coating of the sheet. The following organic color-reactant compounds may be used in place of or in partial substitution for the crystal violet lactone or the N-p-nitrophenyl rhodamine-B lactam: 3,3 bis(p-dimethylaminophenyl) phthalide, known as malachite green lactone and which is normally colorless or white but turns to a blue-green color on the kaolin, or its equivalent; 2,4 bis [p-(p-dimethylaminophenylazo) anilino] 6 hydroxy sym. triazine, producing a dark blue mark on kaolin; o-hydroxy-benzalacetophenone which produces a reddish-yellow mark on kaolin; bis(p-dimethylaminophenyl) methanol, also known as Michler's hydrol, which turns to dark blue on kaolin; and 3,3 bis(p-ethylaminophenyl) phthalide which produces a bright blue mark on Kaolin; and many others, some of which may be found in United States Patent 2,505,470, to which reference has been made.

The organic color-reactant described which produces a red mark, has a bluish tinge and the greens have some yellow, so that they will accommodate the partially color-blind person who can distinguish blue in red and yellow in green.

In sensitizing a large number of sheets which have had the answer areas defined by overprinting, the organic color-reactant solutions may be applied by aid of stencils especially prepared to provide apertures through which the solutions may be applied to the proper areas. In the case of a two-color system, two stencils would ordinarily be used, one to apply the organic color-reactant resulting in one color and the other stencil to be used in applying the organic color-reactant which produces the other color. In case three colors were needed, three stencils could be provided.

To save the necessity of spotting the areas to receive one of the organic solutions, say the mentioned lactam solution producing a red color on the clay-like material, all of the area having the clay-like material may be sensitized with the lactam solution, and then the specific areas to receive the other organic solution producing a blue or green compound may be spotted with such solution. Under such circumstances the areas intended to become red when rubbed with a stylus will do so, whereas the areas to become another hue will do so, the spotted areas when rubbed producing a hue which is red plus blue, or red plus green as the case may be. The reverse may be true where the entire coverage is made with the blue-producing or green-producing organic solution and the spotting is done with the red solution.

Similarly, in scoring the answers, stencils may be used to bring to the examiner's attention those areas under consideration.

While the form of invention herein shown and described is admirably adapted to fill the objects stated, it is to be understood that it is not intended to confine the invention to the one form or embodiment herein desclosed for it is susceptible of embodiment in various other forms.

What is claimed is:

1. An educational device, including, in combination, a record material base web having a plurality of discrete areas thereon, each of which areas represents a proposed answer to an associated one of proposed questions, each one of said areas which represents the correct answer to the associated question containing materials which produce a colored mark of distinctive hue when rubbed by a stylus, and each of said areas which represents an incorrect answer to the said associated proposed questions containing materials which produce a colored mark of a different distinctive hue when rubbed by a stylus.

2. The device of claim 1 in which the base web is paper.

3. The device of claim 1 in which the color-producing materials are visually indistinguishable from the rest of the base web until rubbed by a stylus.

4. The device of claim 1 in which the color-producing materials are dry solids and produce the color by a reaction in the dry state.

5. The device of claim 1 in which there are at least two color producing materials in each area, the said two materials in an area being normally kept from contact by an insulating substance rupturable by a stylus rubbed over said area and materials contained therein to bring said two materials into contact whereby a color-reaction in the dry state takes place between them to produce the distinctive color.

6. The device of claim 1 in which the stylus provides only a rubbing force to bring the materials contained in an area into intimate contact whereby by such contact the associated color is produced.

7. An educational device, including, in combination, a record material base web; a plurality of discrete areas designated thereon, one or more of said areas containing color-reactant materials which produce a colored mark of distinctive hue when rubbed against the web by a stylus, and one or more of the remaining areas of which contain color-reactant materials which produce a colored mark of another distinctive hue when rubbed by a stylus against the web.

8. The device of claim 7, in which the base web is paper.

9. The device of claim 1, in which the color-producing materials are visually indistinguishable from the rest of the base web until rubbed by a stylus.

10. The device of claim 7, in which the color-producing materials are dry solids and produce the color by their reaction in the dry state.

11. The device of claim 7, in which there are at least two color-producing materials in each of said areas, the said two materials in an area being normally kept from contact by an insulating substance rupturable by a stylus rubber over said area and the materials contained therein, to bring said two materials into contact, whereby a color reaction in the dry state takes place between them to produce the distinctive color.

12. The device of claim 7 in which the stylus provides only a rubbing force to bring the materials contained in an area into intimate contact, whereby by such contact the associated color is produced.

13. An educational device including, in combination, a base web having a film thereon containing two or more color-reactant materials in the dry solid state, which film when rubbed against said base web by a stylus brings the said reactant materials into intimate contact whereby they react to produce a mark of distinctive color; and discrete areas on said film which are provided with one or more other color-reactant materials, which areas, when rubbed by a stylus, bring all of said reactant materials thereon into intimate contact, whereby reactions take place producing two distinctive colors which visually blend to produce a mark of another distinctive color.

CLYDE S. ADAMS.

No references cited.